United States Patent
Irie et al.

(10) Patent No.: US 9,601,252 B2
(45) Date of Patent: Mar. 21, 2017

(54) ELECTROMAGNETIC DRIVE DEVICE AND METHOD OF MANUFACTURING ELECTROMAGNETIC DRIVE DEVICE

(71) Applicant: AISIN AW CO. LTD., Anjo-shi, Aichi-ken (JP)

(72) Inventors: Keiichiro Irie, Okazaki (JP); Tomoyuki Tanaka, Konan (JP)

(73) Assignee: AISIN AW CO. LTD., Aichi-ken (JP)

( * ) Notice: Subject to any disclaimer, the term of this patent is extended or adjusted under 35 U.S.C. 154(b) by 0 days.

(21) Appl. No.: 15/107,713

(22) PCT Filed: Jan. 22, 2015

(86) PCT No.: PCT/JP2015/051647
§ 371 (c)(1),
(2) Date: Jun. 23, 2016

(87) PCT Pub. No.: WO2015/115298
PCT Pub. Date: Aug. 6, 2015

(65) Prior Publication Data
US 2016/0329143 A1    Nov. 10, 2016

(30) Foreign Application Priority Data
Jan. 29, 2014    (JP) .................................. 2014-014685

(51) Int. Cl.
*H01F 3/00* (2006.01)
*H01F 7/08* (2006.01)
(Continued)

(52) U.S. Cl.
CPC ............. *H01F 7/081* (2013.01); *F16K 31/06* (2013.01); *F16K 31/0613* (2013.01);
(Continued)

(58) Field of Classification Search
CPC .......... H01F 7/1607; H01F 7/16; H01F 7/129; F16K 31/06
(Continued)

(56) References Cited

U.S. PATENT DOCUMENTS 5,238,222 A * 8/1993 Sumida .................... F02M 3/07
251/118
6,076,550 A * 6/2000 Hiraishi .............. F16K 31/0655
137/550
(Continued)

FOREIGN PATENT DOCUMENTS

JP    56-29917 U    3/1981
JP    6-151162 A    5/1994
(Continued)

OTHER PUBLICATIONS

International Search Report for PCT/JP2015/051647 dated Apr. 14, 2015.

*Primary Examiner* — Shawki S Ismail
*Assistant Examiner* — Lisa Homza
(74) *Attorney, Agent, or Firm* — Sughrue Mion, PLLC

(57) ABSTRACT

Deformation is depressed where cover and connectors are integrally formed from a resin. A core body includes first and second body portions coupled to each other in the axial direction. The first body portion has a tubular shape extending in the axial direction, and a space surrounded by the inner peripheral surface thereof forms a housing space for a member that slides in the axial direction along the inner peripheral surface. The second body portion's outer peripheral surface and a bobbin body portion inner peripheral surface contact each other, and the first body portion outer peripheral surface and a target end portion inner peripheral surface, which is the bobbin body portion's end portion on the side in a direction from the second body portion toward (Continued)

the first body portion in the axial direction, are spaced from each other in at least a part of the region in the circumferential direction.

20 Claims, 6 Drawing Sheets

(51) Int. Cl.
- *F16K 31/06* (2006.01)
- *H01F 7/127* (2006.01)
- *H01F 7/16* (2006.01)
- *H01F 27/32* (2006.01)
- *H01F 41/12* (2006.01)

(52) U.S. Cl.
CPC ........... *H01F 7/127* (2013.01); *H01F 7/1607* (2013.01); *H01F 27/325* (2013.01); *H01F 41/125* (2013.01)

(58) Field of Classification Search
USPC .......................................................... 335/255
See application file for complete search history.

(56) References Cited

U.S. PATENT DOCUMENTS

| | | | | |
|---|---|---|---|---|
| 6,179,005 B1* | 1/2001 | Inami | ................ | F16K 31/0613 137/625.65 |
| 6,206,343 B1* | 3/2001 | Kato | ................ | F16K 31/0613 251/129.15 |
| 6,498,416 B1* | 12/2002 | Oishi | ................ | F02M 51/0614 310/214 |
| 6,752,371 B2* | 6/2004 | Herbert | ................ | E03D 5/10 251/129.17 |
| 6,932,316 B2* | 8/2005 | Herbert | ................ | F16K 7/14 251/129.07 |
| 6,948,697 B2* | 9/2005 | Herbert | ................ | F16K 31/0672 251/129.04 |
| 7,350,763 B2* | 4/2008 | Hofling | ................ | F16K 31/0606 251/129.15 |
| 8,143,984 B2* | 3/2012 | Nagasaki | ................ | F16K 31/0675 335/220 |
| 8,154,370 B2* | 4/2012 | Ishibashi | ................ | H01F 7/081 251/129.15 |
| 8,258,904 B2* | 9/2012 | Ben-Asher | ................ | H01F 7/1615 251/129.01 |
| 8,264,312 B2* | 9/2012 | Hamaoka | ................ | F16K 27/029 335/255 |
| 8,736,409 B2* | 5/2014 | Mita | ................ | F16K 31/0627 251/129.15 |
| 8,814,136 B2* | 8/2014 | Mizui | ................ | F16K 31/06 251/129.15 |
| 8,882,079 B2* | 11/2014 | Kondo | ................ | F01L 1/34 251/129.15 |
| 8,925,508 B2* | 1/2015 | Matsumoto | ................ | H02K 41/02 123/90.15 |
| 2002/0057153 A1* | 5/2002 | Matsusaka | ................ | H01F 7/1607 335/220 |
| 2002/0139951 A1* | 10/2002 | Kawamura | ................ | F16K 31/0613 251/129.15 |
| 2005/0184841 A1* | 8/2005 | Ryuen | ................ | F16K 31/0631 335/220 |
| 2006/0000994 A1* | 1/2006 | Kondo | ................ | F16K 31/0613 251/129.15 |
| 2006/0017535 A1* | 1/2006 | Nagasaki | ................ | H01F 7/1607 335/220 |
| 2006/0243938 A1* | 11/2006 | Ishibashi | ................ | F16K 31/0613 251/129.15 |
| 2007/0057217 A1* | 3/2007 | Kamidate | ................ | F16K 31/061 251/129.15 |
| 2007/0075283 A1* | 4/2007 | Hirano | ................ | F16K 31/061 251/11 |
| 2007/0158604 A1* | 7/2007 | Kondo | ................ | F16K 31/061 251/129.15 |
| 2007/0158606 A1* | 7/2007 | Oishi | ................ | F16K 31/061 251/129.15 |
| 2008/0047617 A1* | 2/2008 | Hirano | ................ | F15B 13/0402 137/487.5 |
| 2008/0115751 A1* | 5/2008 | Knecht | ................ | F01L 1/34 123/90.17 |
| 2008/0258090 A1* | 10/2008 | Najmolhoda | ................ | F01L 1/34 251/129.15 |
| 2008/0308757 A1* | 12/2008 | Nakai | ................ | F16H 61/0251 251/129.15 |
| 2009/0014076 A1* | 1/2009 | Hirano | ................ | F16K 31/426 137/625.6 |
| 2009/0026399 A1* | 1/2009 | Ishibashi | ................ | F16K 31/0613 251/129.15 |
| 2009/0032752 A1* | 2/2009 | Nagasaki | ................ | F16K 31/06 251/129.15 |
| 2009/0032753 A1* | 2/2009 | Ishibashi | ................ | H01F 7/081 251/129.15 |
| 2009/0039992 A1* | 2/2009 | Ryuen | ................ | H01F 7/081 335/255 |
| 2009/0140189 A1* | 6/2009 | Kokubu | ................ | F16K 31/0613 251/129.15 |
| 2010/0308244 A1* | 12/2010 | Oikawa | ................ | F16K 11/0716 251/129.15 |
| 2011/0128104 A1* | 6/2011 | Yasoshima | ................ | H01F 7/127 335/297 |
| 2011/0147630 A1* | 6/2011 | Nisinosono | ................ | F16K 31/06 251/129.15 |
| 2011/0148555 A1* | 6/2011 | Sasao | ................ | H01F 7/1607 335/262 |
| 2012/0126158 A1* | 5/2012 | Yasoshima | ................ | F16K 31/0613 251/129.15 |
| 2012/0154079 A1* | 6/2012 | Sasao | ................ | H01F 7/128 335/278 |
| 2012/0199771 A1* | 8/2012 | Kasagi | ................ | F16K 31/0613 251/129.15 |
| 2013/0248743 A1* | 9/2013 | Kasagi | ................ | F16K 31/0613 251/129.15 |
| 2014/0145100 A1* | 5/2014 | Ishibashi | ................ | F16K 39/024 251/129.15 |
| 2014/0145101 A1* | 5/2014 | Ishibashi | ................ | F02M 21/0239 251/129.15 |
| 2014/0166915 A1* | 6/2014 | Ishibashi | ................ | F02M 21/0239 251/129.15 |

FOREIGN PATENT DOCUMENTS

| | | |
|---|---|---|
| JP | 2001-332419 A | 11/2001 |
| JP | 2014-232768 A | 12/2014 |
| WO | 2013/064226 A2 | 5/2013 |
| WO | 2014/007230 A1 | 1/2014 |

\* cited by examiner

ELECTROMAGNETIC DRIVE DEVICE AND METHOD OF MANUFACTURING ELECTROMAGNETIC DRIVE DEVICE

CROSS REFERENCE TO RELATED APPLICATIONS

This application is a National Stage of International Application No. PCT/JP2015/051647 filed Jan. 22, 2015, claiming priority based on Japanese Patent Application No. 2014-014685 filed Jan. 29, 2014, the contents of all of which are incorporated herein by reference in their entirety.

TECHNICAL FIELD

The present disclosure relates to an electromagnetic drive device that includes a core that has a core body portion, a bobbin in which a tubular bobbin body portion is disposed over the entire region in the circumferential direction on the outer side of the core body portion in the radial direction, a coil wound around the outer peripheral surface of the bobbin body portion, a cover portion that covers the coil from the outer side in the radial direction over the entire region of the bobbin body portion in the axial direction and the circumferential direction, and a connector portion that houses a power feed terminal of the coil, the electromagnetic drive device controlling the position of a sliding member in a housing space formed by the core body portion in the axial direction in accordance with the state of power feed to the coil, and relates to a method of manufacturing the electromagnetic drive device.

BACKGROUND ART

The electromagnetic drive device and the method of manufacturing the electromagnetic drive device described in Japanese Patent Application Publication No. 2001-332419 (JP 2001-332419 A) (Patent Document 1) are known as the electromagnetic drive device described above and the method of manufacturing the electromagnetic drive device. In the following description in the "BACKGROUND ART" section, the names and the reference numerals of members used in Patent Document 1 are cited in brackets. Patent Document 1 describes a technology for forming a cover portion [fixation portion 25] by charging a resin, the cover portion covering a coil [coil 21] from the outer side in the radial direction with a bobbin body portion [tubular portion of a bobbin 23], around which the coil has been wound, disposed on the outer side of a core body portion [tubular portion of a stator core 13] in the radial direction. When forming the cover portion, as illustrated in FIG. 3C of Patent Document 1, the inner peripheral surface of the bobbin body portion is disposed so as to contact the outer peripheral surface of the core body portion over substantially the entire region in the axial direction.

RELATED-ART DOCUMENTS

Patent Documents

[Patent Document 1] Japanese Patent Application Publication No. 2001-332419 (JP 2001-332419 A) (paragraphs 0026 and 0027, FIG. 3, etc.)

SUMMARY

In such an electromagnetic drive device, in general, a connector portion that houses the power feed terminal of the coil is formed in a part of the region in the circumferential direction, although not clearly stated in Patent Document 1. Both the cover portion and the connector portion are formed from a resin which is a material that has electrical insulation. Therefore, it is conceivable to integrally form the cover portion and the connector portion from a resin (e.g. through injection molding). In the case of such a configuration, however, the member which is integrally formed from a resin is not uniform in shape in the circumferential direction. Therefore, a contraction force generated when the resin is cooled to be cured may be non-uniform in the circumferential direction, which may apply an offset load to the core body portion which is disposed on the inner side of the cover portion in the radial direction. Depending on the magnitude of the offset load, the core body portion which forms a sliding surface for the sliding member may be deformed to such a degree as to lower the performance of the electromagnetic drive device. In Patent Document 1, however, such an issue is not taken into special consideration.

In view of the foregoing, it is desirable to provide a technology that makes it possible to suppress deformation of a core body portion in the case where a cover portion and a connector portion are integrally formed from a resin.

In view of the foregoing, the present disclosure provides an electromagnetic drive device including a core that has a core body portion that extends in an axial direction, a bobbin that has a tubular bobbin body portion that extends in the axial direction, the bobbin body portion being disposed on an outer side of the core body portion in a radial direction over an entire region of the core body portion in a circumferential direction, a coil wound around an outer peripheral surface of the bobbin body portion, a cover portion that covers the coil from the outer side in the radial direction over an entire region of the bobbin body portion in the axial direction and the circumferential direction, and a connector portion that houses a power feed terminal of the coil, the core body portion including a first body portion and a second body portion coupled to each other in the axial direction, the first body portion being formed in a tubular shape that extends in the axial direction, and a space surrounded by an inner peripheral surface of the first body portion forming a housing space for a sliding member that slides in the axial direction along the inner peripheral surface, the second body portion being formed in a tubular shape that extends in the axial direction and that has an inner peripheral surface that is smaller in diameter than the inner peripheral surface of the first body portion, or formed in a solid columnar shape that extends in the axial direction, and the electromagnetic drive device controlling a position of the sliding member in the housing space in the axial direction in accordance with a state of power feed to the coil, the electromagnetic drive device includes that: the cover portion and the connector portion are integrally formed from a resin; and an outer peripheral surface of the second body portion and an inner peripheral surface of the bobbin body portion contact each other, and an outer peripheral surface of the first body portion and an inner peripheral surface of a target end portion, which is an end portion of the bobbin body portion on a side in a direction from the second body portion toward the first body portion in the axial direction, are spaced from each other in at least a part of a region in the circumferential direction.

In the characteristic configuration described above, the cover portion and the connector portion are integrally formed from a resin. Therefore, the resin in the vicinity of the coupling portion between the cover portion and the connector portion may be cured at a delayed timing compared to the resin in the other parts during execution of a resin molding step (e.g. an injection molding step). This is because the resin in the vicinity of the coupling portion may be cooled at a low speed because of the presence of a great amount of resin in the vicinity of the coupling portion, a limited heat conduction path through the molding die in the vicinity of the coupling portion, etc. In the case where the resin in the vicinity of the coupling portion is cured at a delayed timing in this way, a contraction force in the direction of pulling the resin which has already been cured toward the coupling portion is applied when the resin in the vicinity of the coupling portion is cured. Regarding the first body portion and the second body portion of the core body portion, the second body portion is formed in a tubular shape that has an inner peripheral surface that is smaller in diameter than the inner peripheral surface of the tubular first body portion, or formed in a solid columnar shape. Therefore, the first body portion, in which the housing space for the sliding member is formed, is significantly affected by an offset load due to the contraction force compared to the second body portion.

In view of this respect, in the characteristic configuration described above, the outer peripheral surface of the second body portion and the inner peripheral surface of the bobbin body portion contact each other, and the outer peripheral surface of the first body portion and the inner peripheral surface of the target end portion of the bobbin body portion are spaced from each other in at least a part of the region in the circumferential direction. Consequently, it is possible to suppress deformation of the core body portion by suppressing application of an offset load due to the contraction force generated when the resin is cured to the first body portion, which is easily deformable compared to the second body portion, during execution of the resin molding step. That is, with the characteristic configuration described above, it is easy to provide an electromagnetic drive device in which the cover portion and the connector portion are integrally formed from a resin and in which deformation of the core body portion is suppressed.

Preferable aspects of the present disclosure will be described below. It should be noted, however, that the scope of the present disclosure is not limited by the preferable aspects described below.

In one aspect, preferably, the first body portion has a magnetic flux restriction portion provided in a region in which the bobbin body portion is disposed in the axial direction, the magnetic flux restriction portion restricting magnetic flux that passes through the first body portion in the axial direction; a thickness of the first body portion at a location where the magnetic flux restriction portion is formed is smaller than a thickness of parts of the core body portion positioned in the axial direction on both sides of the magnetic flux restriction portion; and the outer peripheral surface of the first body portion and the inner peripheral surface of the bobbin body portion are spaced from each other in an entire region in the axial direction on a side opposite of the magnetic flux restriction portion from the second body portion in the axial direction.

The magnetic flux restriction portion described above is intended to apply a magnetic attraction force to the sliding member by forming a flow of magnetic flux via the sliding member between a part of the first body portion on the side opposite of the magnetic flux restriction portion from the second body portion in the axial direction and the second body portion. In the configuration described above, the magnetic flux restriction portion is formed by reducing the thickness of a part of the first body portion. In order to appropriately generate a magnetic attraction force, the magnetic flux restriction portion is generally provided at a position close to an end portion of the first body portion on the side of the second body portion in the axial direction. Therefore, the first body portion is configured to be easily deformable in the case where an offset load is applied to a part of the first body portion on the side opposite of the magnetic flux restriction portion from the second body portion in the axial direction. In this respect, in the configuration described above, the outer peripheral surface of the first body portion and the inner peripheral surface of the bobbin body portion are spaced from each other in the entire region in the axial direction on the side opposite of the magnetic flux restriction portion from the second body portion the magnetic flux restriction portion in the axial direction. Therefore, it is possible to suppress deformation of the core body portion by suppressing application of an offset load due to the contraction force generated when the resin is cured to a part of the first body portion on the side opposite of the magnetic flux restriction portion from the second body portion in the axial direction.

In one aspect, preferably, the electromagnetic drive device further includes a case that houses the cover portion; the first body portion has a magnetic flux exchange surface provided on a side opposite of the target end portion of the bobbin body portion from the second body portion in the axial direction, the magnetic flux exchange surface being an outer peripheral surface disposed so as to face the case in the radial direction in order to exchange magnetic flux with the case; and the magnetic flux exchange surface is larger in diameter than a part of the outer peripheral surface of the first body portion that faces the target end portion of the bobbin body portion in the radial direction.

With the configuration, a large magnetic path cross-sectional area between the magnetic flux exchange surface and the case can be secured compared to a case where the magnetic flux exchange surface is equal in diameter to a part of the outer peripheral surface of the first body portion that faces the target end portion of the bobbin body portion in the radial direction. Hence, the permeance between the magnetic flux exchange surface and the case can be increased (in other words, magnetic flux that leaks when magnetic flux is exchanged can be reduced), as a result of which the magnetic attraction force to be applied to the sliding member can be easily improved.

In one aspect, preferably, a coupling portion between the connector portion and the cover portion is formed in a part of a region in the circumferential direction; the outer peripheral surface of the first body portion and the inner peripheral surface of the target end portion of the bobbin body portion are spaced from each other in a specific region in the circumferential direction; and the specific region is a region in the circumferential direction on a side opposite of an axis of the core body portion from the region where the coupling portion is disposed.

With the configuration, the outer peripheral surface of the first body portion and the inner peripheral surface of the target end portion of the bobbin body portion can be spaced from each other in a region in the circumferential direction that is appropriate from the viewpoint of suppressing deformation of the core body portion while appropriately considering the fact that an offset load toward the coupling portion between the cover portion and the connector portion may be applied to the target end portion of the bobbin body portion because of the contraction force generated when the resin is cured during execution of a resin molding step (e.g. an injection molding step).

In one aspect, preferably, the outer peripheral surface of the first body portion and the inner peripheral surface of the target end portion of the bobbin body portion are spaced from each other in an entire region in the circumferential direction.

With the configuration, the spaced portion in which the outer peripheral surface of the first body portion and the inner peripheral surface of the target end portion of the bobbin body portion are spaced from each other can be formed by relatively simple processing such as lathing, for example, compared to a case where the outer peripheral surface of the first body portion and the inner peripheral surface of the target end portion of the bobbin body portion are spaced from each other in only a part of the region in the circumferential direction. Hence, the steps for manufacturing the electromagnetic drive device can be simplified.

In one aspect, preferably, the connector portion has a part that extends in the axial direction on an outer side of the cover portion in the radial direction.

With the configuration, it is necessary to dispose a molding die in a gap that extends in the axial direction between a part of the connector portion that extends in the axial direction on the outer side of the cover portion in the radial direction and the cover portion during execution of a resin molding step (e.g. an injection molding step). Therefore, a heat conduction path through the molding die in the vicinity of the coupling portion between the cover portion and the connector portion tends to be limited during execution of the resin molding step, as a result of which the resin in the vicinity of the coupling portion tends to be cooled at a low speed. In this respect, in the electromagnetic drive device according to the present disclosure, as described above, it is possible to suppress deformation of the core body portion by suppressing application of an offset load due to the contraction force generated when the resin is cured to the first body portion during execution of the resin molding step. Thus, the configuration according to the present disclosure discussed above is particularly suitable to a case where the connector portion has a part that extends in the axial direction on the outer side of the cover portion in the radial direction.

In view of the foregoing, the present disclosure also provides a method of manufacturing an electromagnetic drive device including a core that has a tubular core body portion that extends in an axial direction, a bobbin that has a tubular bobbin body portion that extends in the axial direction, the bobbin body portion being disposed on an outer side of the core body portion in a radial direction over an entire region of the core body portion in a circumferential direction, a coil wound around an outer peripheral surface of the bobbin body portion, a cover portion that covers the coil from the outer side in the radial direction over an entire region of the bobbin body portion in the axial direction and the circumferential direction, and a connector portion that houses a power feed terminal of the coil, the core body portion including a first body portion and a second body portion coupled to each other in the axial direction, the first body portion being formed in a tubular shape that extends in the axial direction, and a space surrounded by an inner peripheral surface of the first body portion forming a housing space for a sliding member that slides in the axial direction along the inner peripheral surface, the second body portion being formed in a tubular shape that extends in the axial direction and that has an inner peripheral surface that is smaller in diameter than the inner peripheral surface of the first body portion, or formed in a solid columnar shape that extends in the axial direction, and the electromagnetic drive device controlling a position of the sliding member in the housing space in the axial direction in accordance with a state of power feed to the coil, the method including: an arrangement step of disposing the core body portion on an inner side of the bobbin body portion in the radial direction such that an outer peripheral surface of the second body portion and an inner peripheral surface of the bobbin body portion contact each other, and such that an outer peripheral surface of the first body portion and an inner peripheral surface of a target end portion, which is an end portion of the bobbin body portion on a side in a direction from the second body portion toward the first body portion in the axial direction, are spaced from each other in at least a part of a region in the circumferential direction; and an injection molding step of integrally forming the connector portion and the cover portion through injection molding of a resin, the injection molding step being executed after execution of the arrangement step.

With the characteristic configuration described above, the first body portion, in which the housing space for the sliding member is formed, is significantly affected by an offset load due to the contraction force of a resin compared to the second body portion for the reason discussed above when the connector portion and the cover portion are integrally formed in the injection molding step. In this respect, in the characteristic configuration described above, the core body portion is disposed on the inner side of the bobbin body portion in the radial direction such that the outer peripheral surface of the first body portion and the inner peripheral surface of the target end portion, which is an end portion of the bobbin body portion on the side in the direction from the second body portion toward the first body portion in the axial direction, are spaced from each other in at least a part of the region in the circumferential direction in the arrangement step which is executed before execution of the injection molding step. Hence, it is possible to suppress deformation of the core body portion by suppressing application of an offset load due to the contraction force generated when the resin is cured to the first body portion, which is easily deformable compared to the second body portion, during execution of the injection molding step. That is, with the characteristic configuration described above, the cover portion and the connector portion can be integrally formed through injection molding of a resin while suppressing deformation of the core body portion.

DETAILED DESCRIPTION OF THE PREFERRED EMBODIMENTS

Figure 1:
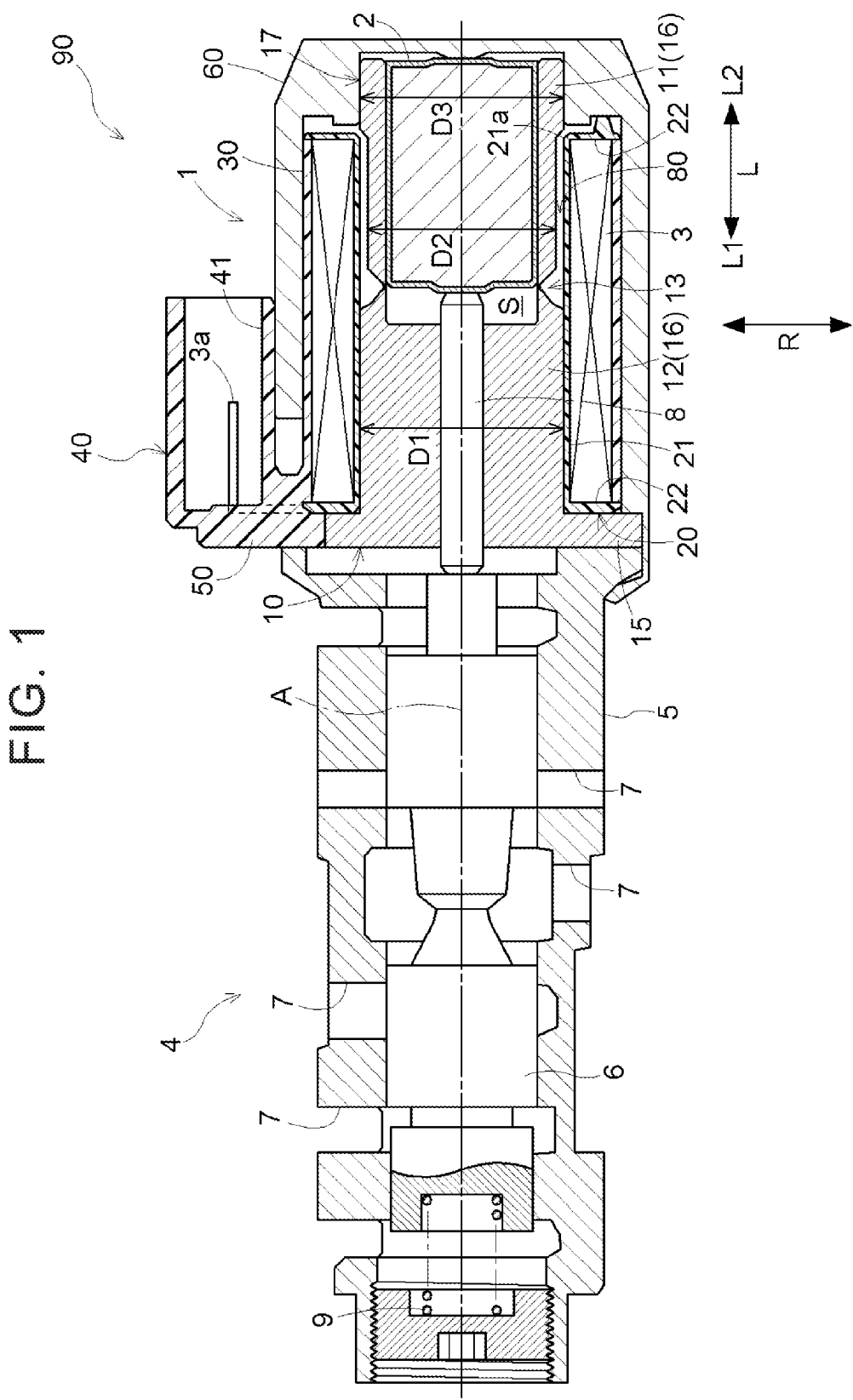
FIG. 1 is a sectional view of an electromagnetic valve that includes an electromagnetic drive device according to an embodiment.

An electromagnetic drive device and a method of manufacturing an electromagnetic drive device according to an embodiment of the present disclosure will be described with reference to the drawings. Here, a case where the electromagnetic drive device according to the present disclosure is applied to an electromagnetic valve 90 (see FIG. 1) will be described as an example.

In the following description, unless specifically differentiated, the "axial direction L", the "circumferential direction C", and the "radial direction R" are defined with reference to the axis A of a core 10 (core body portion 16) (see FIGS. 1, 6, etc.). The "first axial direction L1" indicates the direction toward one side in the axial direction L. The "second axial direction L2" indicates the direction toward the other side in the axial direction L (the direction opposite to the first axial direction L1). As discussed later, the core body portion 16 includes a first body portion 11 and a second body portion 12 coupled to each other in the axial direction L. The first axial direction L1 is the direction from the first body portion 11 toward the second body portion 12 along the axial direction L. The second axial direction L2 is the direction from the second body portion 12 toward the first body portion 11 along the axial direction L. In the embodiment, as illustrated in FIG. 1, the first axial direction L1 is the direction from the side of the electromagnetic drive device 1 toward the side of a device (in the embodiment, a valve portion 4) to be driven by the electromagnetic drive device 1 along the axial direction L.

In the following, members that compose the electromagnetic valve 90 are described using the axial direction L, the circumferential direction C, and the radial direction R on the assumption that the members are assembled to the electromagnetic valve 90 as a finished product even when the members in a manufacturing stage are described. In the following description, in addition, terms related to the dimension, the arrangement direction, the arrangement position, and so forth (such as parallel, orthogonal, and coaxial, for example) of each member may allow a difference due to an error (an error that may be tolerated during manufacture).

1. Schematic Configuration of Electromagnetic Valve

As illustrated in FIG. 1, the electromagnetic valve 90 includes the electromagnetic drive device 1 and the valve portion 4. The electromagnetic drive device 1 will be described in detail later in "2. Configuration of Electromagnetic Drive Device". The valve portion 4 is driven by the electromagnetic drive device 1, and regulates an input hydraulic pressure and outputs the regulated hydraulic pressure. The electromagnetic valve 90 is used to control the hydraulic pressure of working oil supplied to engagement devices such as clutches and brakes, for example.

The valve portion 4 includes a tubular sleeve 5 in which a plurality of ports 7 are formed, and a spool 6 that slides in the axial direction L inside the sleeve 5. The plurality of ports 7 include an input port to which oil (e.g. oil at a line pressure) is input, an output port from which oil which has been subjected to the pressure regulation by the valve portion 4 is output, a discharge port from which oil is discharged (drained), and so forth. The hydraulic pressure output from the output port is controlled by changing the state of communication between the ports 7 in accordance with the position of the spool 6 in the axial direction L. The spool 6 is configured to be moved in the axial direction L in conjunction with a plunger 2 driven by the electromagnetic drive device 1. In the embodiment, the spool 6 is configured to be moved in the axial direction L together with the plunger 2.

Specifically, as illustrated in FIG. 1, a shaft 8 is interposed between the spool 6 and the plunger 2 in the axial direction L. The spool 6 is urged by an urging member 9 toward the side in the second axial direction L2 (the side of the electromagnetic drive device 1 in the axial direction L), which causes an end portion of the spool 6 on the side in the second axial direction L2 to abut against the shaft 8 and causes an end portion of the shaft 8 on the side in the second axial direction L2 to abut against the plunger 2. The spool 6 is basically moved in the axial direction L together with the plunger 2 either in the case where the plunger 2 is moved toward the side in the first axial direction L1 against the urging force of the urging member 9 by an electromagnetic drive force generated by the electromagnetic drive device 1 or in the case where the plunger 2 is moved toward the side in the second axial direction L2 by the urging force of the urging member 9.

2. Configuration of Electromagnetic Drive Device

Next, the configuration of the electromagnetic drive device 1 as an essential portion of the present disclosure will be described. As illustrated in FIG. 1, the electromagnetic drive device 1 includes the core 10, a bobbin 20, a coil 3, a cover portion 30, and a connector portion 40. The electromagnetic drive device 1 controls the position of the plunger 2, which slides along the inner peripheral surface of the core body portion 16 (the first body portion 11 to be discussed later), in the axial direction L (the position in the axial direction L in a plunger housing space S to be discussed later) in accordance with the state of power feed to the coil 3. The core 10, the plunger 2, and a case 60 to be discussed later are formed from a ferromagnetic material (such as high-purity iron, for example). At least one of the outer peripheral surface of the plunger 2 and the inner peripheral surface of the core body portion 16 (in the example, only the former) is provided with a non-magnetic layer formed from a non-magnetic material (such as nickel and phosphorus, for example). In addition, the bobbin 20, the cover portion 30, and the connector portion 40 are formed from a resin which is a material that has electrical insulation (a thermoplastic resin such as a polyphenylene sulfide resin, for example). In the embodiment, the plunger 2 corresponds to the "sliding member" according to the present disclosure.

The core 10 includes the tubular core body portion 16 which extends in the axial direction L. The core body portion 16 is formed by cutting or the like, for example. As illustrated in FIG. 6, the core body portion 16 is formed in a cylindrical shape. Specifically, the core body portion 16 includes the first body portion 11 and the second body portion 12 which are coupled to each other in the axial direction L. The first body portion 11 is formed in a tubular shape that extends in the axial direction L. The second body portion 12 is formed in a tubular shape that extends in the axial direction L and that has an inner peripheral surface that is smaller in diameter than the inner peripheral surface of the first body portion 11, or formed in a solid columnar shape that extends in the axial direction L. A bobbin body portion 21 to be discussed later is disposed on the outer side of the core body portion 16 in the radial direction R. The core body portion 16 has a magnetic flux restriction portion 13 provided in the region in which the bobbin body portion 21 is disposed in the axial direction L. The magnetic flux restriction portion 13 is a part that restricts magnetic flux that passes through the core body portion 16 in the axial direction L. The magnetic flux restriction portion 13 is formed in the first body portion 11, and restricts magnetic flux that passes through the first body portion 11 in the axial direction L. The magnetic flux restriction portion 13 is formed in the vicinity of an end portion of the first body portion 11 on the side in the first axial direction L1 (a coupling portion with the second body portion 12). A part of the core body portion 16 on the side in the first axial direction L1 with respect to the magnetic flux restriction portion 13 applies a magnetic attraction force to the plunger 2 when the coil 3 is energized. That is, the plunger 2 is attracted to be moved in the first axial direction L1 when the coil 3 is energized. Since a part of the core body portion 16 on the side in the first axial direction L1 with respect to the magnetic flux restriction portion 13 applies a magnetic attraction force to the plunger 2 when the coil 3 is energized in the manner described above, it is possible to provide a spaced portion 80 to be discussed later while suppressing an effect on the magnetic circuit.

The magnetic flux restriction portion 13 is configured such that the magnetic resistance of the core body portion 16 at the magnetic flux restriction portion 13 is larger than that of parts of the core body portion 16 in the axial direction L on both sides of the magnetic flux restriction portion 13. In addition, the magnetic flux restriction portion 13 is formed over the entire region in the circumferential direction C. In the embodiment, as illustrated in FIG. 1, the magnetic flux restriction portion 13 is formed by reducing the wall thickness (the thickness of the tubular part) of the core body portion 16 at the location where the magnetic flux restriction portion 13 is formed to be smaller than that of parts in the axial direction L on both sides of the region. That is, the magnetic flux restriction portion 13 is formed by making the thickness of the first body portion 11 at the location where the magnetic flux restriction portion 13 is formed smaller than the thickness of parts of the core body portion 16 (in the example, the first body portion 11) positioned in the axial direction L on both sides of the magnetic flux restriction portion 13. In the embodiment, the magnetic resistance is increased by reducing the magnetic path area at the magnetic flux restriction portion 13. Specifically, in the embodiment, the magnetic flux restriction portion 13 is formed by a recessed portion formed in the outer peripheral portion of the core body portion 16 and dented inward in the radial direction R. In the embodiment, in addition, the magnetic flux restriction portion 13 is formed in the vicinity, in the axial direction, of an end surface of the plunger 2 on the side in the first axial direction L1 with the plunger 2 moved to the position (see FIG. 1) at which the plunger 2 is farthest from the second body portion 12 in the axial direction L. Providing such a magnetic flux restriction portion 13 suppresses a flow of magnetic flux not via the plunger 2 between a part of the first body portion 11 on the side in the second axial direction L2 with respect to the magnetic flux restriction portion 13 and the second body portion 12. As a result, when the coil 3 is energized, a flow of magnetic flux via the plunger 2 is formed between the part of the first body portion 11 and the second body portion 12, which applies a magnetic attraction force to the plunger 2. Meanwhile, the inner peripheral surface of the core body portion 16 (in the example, the first body portion 11) is formed to be uniform (equal in diameter) along the axial direction L over the entire region in the axial direction L including the region in which the magnetic flux restriction portion 13 is formed. In order to secure the strength of the core body portion 16 etc., a member formed from a non-magnetic material may be disposed in the recessed portion which forms the magnetic flux restriction portion 13.

In the embodiment, the core body portion 16 includes the first body portion 11 which is in a cylindrical shape that extends in the axial direction L, and the second body portion 12 which is coupled to the side of the first body portion 11 in the first axial direction L1. A cylindrical housing space (plunger housing space S) that houses the plunger 2 is formed by the inner peripheral surface of the first body portion 11. The plunger 2 slides in the axial direction L along the inner peripheral surface of the first body portion 11 inside the plunger housing space S. The bottom portion (an end portion on the side in the first axial direction L1) of the plunger housing space S is formed by an end surface of the second body portion 12 on the side in the second axial direction L2. In the embodiment, the second body portion 12 is formed in a cylindrical shape with an inner peripheral surface smaller in diameter than the first body portion 11, and the entire core body portion 16 is formed in a cylindrical shape that extends in the axial direction L. That is, in the embodiment, the second body portion 12 is formed in a tubular shape that extends in the axial direction L and that has an inner peripheral surface that is smaller in diameter than the inner peripheral surface of the first body portion 11. The shaft 8 is inserted through a hole portion, which is formed by the inner peripheral surface of the second body portion 12 and which extends in the axial direction L, so as to be slidable in the axial direction L. In the embodiment, the first body portion 11 and the second body portion 12 are formed integrally with each other. In the embodiment, in addition, a flange portion 15 that projects outward in the radial direction R with respect to the outer peripheral surface of the second body portion 12 is coupled to an end portion of the second body portion 12 on the side in the first axial direction L1. In the embodiment, the second body portion 12 and the flange portion 15 are formed integrally with each other. In the embodiment, the plunger housing space S corresponds to the "housing space" according to the present disclosure.

The bobbin 20 includes the tubular bobbin body portion 21 which extends in the axial direction L. As illustrated in FIG. 6, the bobbin body portion 21 is formed in a cylindrical shape. The coil 3 is wound around the outer peripheral surface of the bobbin body portion 21. The coil 3 is a tubular coil (in the example, a cylindrical coil) that is formed by winding a coated conductor around the outer peripheral surface of the bobbin body portion 21 and that extends in the axial direction L. The bobbin body portion 21 is disposed over the entire region in the circumferential direction C on the outer side of the core body portion 16 in the radial direction R. In the embodiment, flange-shaped holding portions 22 that extend outward in the radial direction R are formed at respective end portions of the bobbin body portion 21 on both sides in the axial direction L so as to hold the coil 3 from both sides in the axial direction L. As illustrated in FIG. 1, the holding portion 22 on the side in the first axial direction L1 is disposed so as to contact the flange portion 15 of the core 10 from the side in the second axial direction L2.

In the embodiment, the bobbin body portion 21 is disposed with respect to the core body portion 16 such that the entire region in which the bobbin body portion 21 is disposed in the axial direction L is included in the region in which the core body portion 16 is disposed in the axial direction L. Specifically, an end portion (a target end portion 21a to be discussed later) of the bobbin body portion 21 on the side in the second axial direction L2 is disposed on the side in the first axial direction L1 with respect to an end portion of the core body portion 16 (in the example, the first body portion 11) on the side in the second axial direction L2. In addition, an end portion of the bobbin body portion 21 on the side in the first axial direction L1 is disposed at the same position in the axial direction L as an end portion of the core body portion 16 (in the example, the second body portion 12) on the side in the first axial direction L1.

Figure 5:
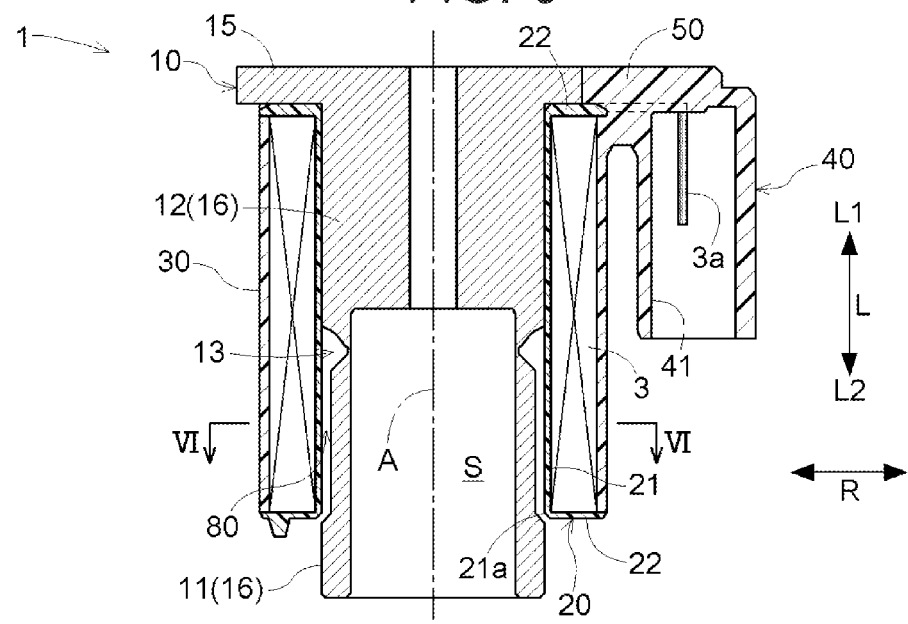
FIG. 5 is a sectional view illustrating the arrangement state of each portion after execution of the injection molding step according to the embodiment.

The cover portion 30 is formed to cover the coil 3 from the outer side in the radial direction R over the entire region of the bobbin body portion 21 in the axial direction L and the circumferential direction C. That is, as illustrated in FIGS. 5 and 6, the cover portion 30 is formed in a cylindrical shape that extends in the axial direction L and that is larger in diameter than the cylindrical coil 3. The case 60 is disposed so as to house the core 10, the bobbin 20, the coil 3, and the cover portion 30. The case 60 is formed in a bottomed tubular shape. Here, the term "bottomed tubular shape" refers to a shape that has a tubular portion that extends in the axial direction L and a bottom portion that closes (or closes only a part of) an opening portion of the tubular portion on one side in the axial direction L. Specifically, the case 60 is formed in a bottomed tubular shape that opens on the side in the first axial direction L1, and has a cylindrical portion disposed on the outer side of the cover portion 30 in the radial direction R over the entire region in the circumferential direction C, and a bottom portion that closes the opening portion of the cylindrical portion on the side in the second axial direction L2 with respect to the core 10 and the bobbin 20. Hence, the opening portion of the plunger housing space S, which is formed in a bottomed tubular shape that opens on the side in the second axial direction L2 by the inner peripheral surface of the first body portion 11, is closed by the bottom portion of the case 60. As illustrated in FIG. 1, the case 60 (the cylindrical portion described above) which houses the cover portion 30 is disposed so as to be fitted (externally fitted) with the outer peripheral surface (a magnetic flux exchange surface 17 to be discussed later) of a part of the first body portion 11 on the side in the second axial direction L2. In addition, the electromagnetic drive device 1 and the valve portion 4 are fixed to each other with an end portion of the case 60 on the side in the first axial direction L1 and an end portion of the sleeve 5 of the valve portion 4 on the side in the second axial direction L2 joined (e.g. joined by swaging) to each other.

The connector portion 40 is formed to house a power feed terminal 3a of the coil 3. An end portion of the coated conductor which constitutes the coil 3 is electrically connected to the power feed terminal 3a. Electric power is supplied to the coil 3 via the power feed terminal 3a with a connector (external connector) on the power source side connected to the connector portion 40. The connector portion 40 is disposed on the outer side of the cover portion 30 in the radial direction R. In the example, the connector portion 40 is disposed on the outer side of the case 60 in the radial direction R. In the embodiment, the connector portion 40 has a part that extends in the axial direction L on the outer side of the cover portion 30 in the radial direction R. The part which extends in the axial direction L has a part disposed in the region in which the cover portion 30 is disposed in the axial direction L. Specifically, the connector portion 40 is formed in a bottomed tubular shape (in the example, a bottomed tubular shape that opens on the side in the second axial direction L2) that has a tubular portion 41 that extends in the axial direction L, and the tubular portion 41 is disposed so as to extend in the axial direction L on the outer side of the cover portion 30 in the radial direction R.

The cover portion 30 and the connector portion 40 are integrally formed from a resin. In the embodiment, the cover portion 30 and the connector portion 40 are integrally formed through injection molding of a resin with the bobbin body portion 21, around which the coil 3 has been wound, disposed on the outer side of the core body portion 16 in the radial direction R. The injection molding will be described in detail later in "3. Method of Manufacturing Electromagnetic Drive Device". In the embodiment, as illustrated in FIG. 1, the connector portion 40 is coupled to the cover portion 30 on the side in the first axial direction L1 with respect to the magnetic flux restriction portion 13. That is, a coupling portion 50 between the connector portion 40 and the cover portion 30 is formed on the side in the first axial direction L1 with respect to the magnetic flux restriction portion 13. The coupling portion 50 is formed to extend in the radial direction R so as to couple the cover portion 30 and the connector portion 40 (tubular portion 41) which is disposed on the outer side of the cover portion 30 in the radial direction R. In the embodiment, the coupling portion 50 is configured to couple an end portion of the cover portion 30 on the side in the first axial direction L1 to the connector portion 40, and the connector portion 40 (tubular portion 41) is formed to extend from the coupling portion 50 toward the side in the second axial direction L2. In addition, as illustrated in FIG. 6, the coupling portion 50 is formed in a part of the region in the circumferential direction C.

As illustrated in FIG. 1, the outer peripheral surface of the core body portion 16 and the inner peripheral surface of the bobbin body portion 21 contact each other on the side in the first axial direction L1 with respect to the magnetic flux restriction portion 13. Specifically, the outer peripheral surface of a part of the first body portion 11 on the side in the first axial direction L1 with respect to the magnetic flux restriction portion 13 contacts the inner peripheral surface of the bobbin body portion 21, and the outer peripheral surface of the second body portion 12 contacts the inner peripheral surface of the bobbin body portion 21 over the entire region of the second body portion 12 in the axial direction L. In the embodiment, the outer peripheral surface of the core body portion 16 and the inner peripheral surface of the bobbin body portion 21 contact each other over the entire region in the circumferential direction C on the side in the first axial direction L1 with respect to the magnetic flux restriction portion 13. The outer peripheral surface of the second body portion 12 and the inner peripheral surface of the bobbin body portion 21 contact each other in the manner described above.

Meanwhile, the spaced portion 80, in which the outer peripheral surface of the core body portion 16 and the inner peripheral surface of the bobbin body portion 21 are spaced from each other, is formed in the region in the axial direction L on the side in the second axial direction L2 with respect to the magnetic flux restriction portion 13 and corresponding to an end portion (hereinafter referred to as "target end portion 21a") of the bobbin body portion 21 on the side in the second axial direction L2. The target end portion 21a is an end portion of the bobbin body portion 21 on the side in the direction from the second body portion 12 toward the first body portion 11 in the axial direction L. In the embodiment, the region in the axial direction L corresponding to the target end portion 21a is set on the side in the second axial direction L2 with respect to the magnetic flux restriction portion 13 so as to include the position of the target end portion 21a in the axial direction L. Specifically, in the embodiment, the region in the axial direction L corresponding to the target end portion 21a is set as a region in the axial direction L that extends from the position of the target end portion 21a in the axial direction L to the region in which the magnetic flux restriction portion 13 is formed in the axial direction L. In the embodiment, as discussed above, the magnetic flux restriction portion 13 is formed by a recessed portion formed in the outer peripheral portion of the core body portion 16 and dented inward in the radial direction R, and the outer peripheral surface of the core body portion 16 and the inner peripheral surface of the bobbin body portion 21 are spaced from each other also in the region in which the magnetic flux restriction portion 13 is formed in the axial direction L as in the spaced portion 80. In this way, the outer peripheral surface of the first body portion 11 and the inner peripheral surface of the target end portion 21a of the bobbin body portion 21 are spaced from each other in at least a part of the region in the circumferential direction C. In the embodiment, the outer peripheral surface of the first body portion 11 and the inner peripheral surface of the bobbin body portion 21 are spaced from each other in the entire region, in the axial direction, on the side opposite of the magnetic flux restriction portion 13 from the second body portion 12 (on the side in the second axial direction L2) in the axial direction L.

Figure 6:
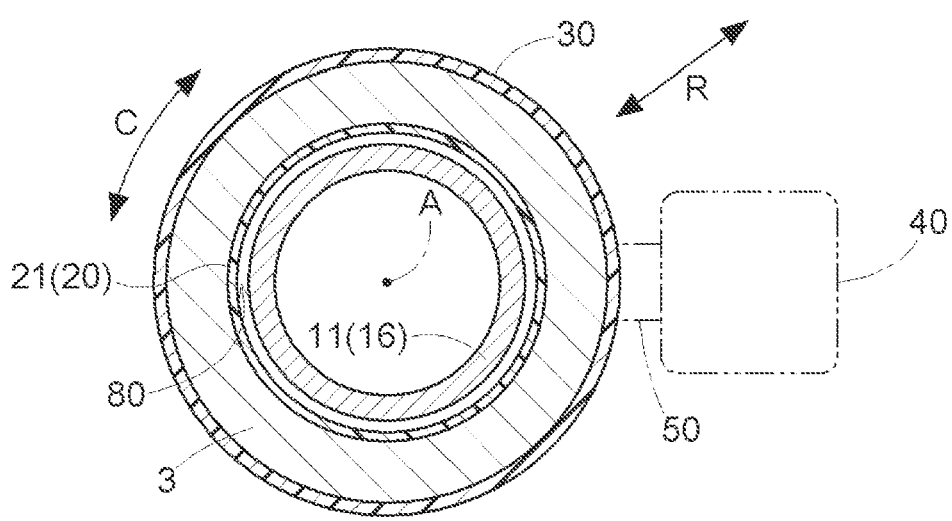
FIG. 6 is a VI-VI cross-sectional view of FIG. 5.

In the embodiment, as illustrated in FIG. 6, the spaced portion 80 is formed over the entire region in the circumferential direction C. In other words, the outer peripheral surface of the first body portion 11 and the inner peripheral surface of the target end portion 21a of the bobbin body portion 21 are spaced from each other in the entire region in the circumferential direction C. In the example, the outer peripheral surface of the first body portion 11 and the inner peripheral surface of the bobbin body portion 21 are spaced from each other in the entire region in the axial direction L and the circumferential direction C on the side in the second axial direction L2 with respect to the magnetic flux restriction portion 13 in the axial direction L. That is, the region in the circumferential direction C on the side opposite of the axis A from the region where the coupling portion 50 is disposed is included in the region in which the spaced portion 80 is formed in the circumferential direction C. Here, the region in the circumferential direction C on the side opposite of the axis A from the region where the coupling portion 50 is disposed is a region that has a range of up to 180 degrees and mainly includes the region in the circumferential direction C that is shifted by 180 degrees (πradian) from the region in which the coupling portion 50 is disposed in the circumferential direction C. The region in the circumferential direction C that is shifted by 180 degrees from the region in which the coupling portion 50 is disposed in the circumferential direction C is a region in the circumferential direction C disposed point-symmetrically about the axis A with respect to the region in which the coupling portion 50 is disposed in the circumferential direction C as seen in the axial direction L.

In the embodiment, the inner peripheral surface of the bobbin body portion 21 is formed to be uniform (equal in diameter) in the entire region in the axial direction L. The spaced portion 80 is formed by making the outer peripheral surface of the core body portion 16 (in the example, the first body portion 11) in the region in the axial direction L corresponding to the target end portion 21a smaller in diameter than the outer peripheral surface of the core body portion 16 (in the example, the first body portion 11 and the second body portion 12) on the side in the first axial direction L1 with respect to the magnetic flux restriction portion 13. That is, in the embodiment, as illustrated in FIG. 1, when the diameter of the outer peripheral surface (cylindrical outer peripheral surface) of the second body portion 12 is defined as "D1" and the diameter of a part of the outer peripheral surface (cylindrical outer peripheral surface) of the first body portion 11 that faces the target end portion 21a of the bobbin body portion 21 in the radial direction R is defined as "D2", the core body portion 16 is formed such that a relationship "D2<D1" is established. In the embodiment, in addition, the outer peripheral surface of the core body portion 16 on the side in the second axial direction L2 with respect to the spaced portion 80 is formed to be larger in diameter than the outer peripheral surface of the core body portion 16 in the region in which the spaced portion 80 is formed in the axial direction L. That is, in the embodiment, as illustrated in FIG. 1, when the diameter of the magnetic flux exchange surface 17 (cylindrical outer peripheral surface) of the first body portion 11 is defined as "D3", the core body portion 16 is formed such that a relationship "D3>D2" is established. In the embodiment, in order to fit (externally fit) the bobbin body portion 21 with the core body portion 16 along the axial direction L from the side in the second axial direction L2 when disposing the bobbin body portion 21 on the outer side of the core body portion 16 in the radial direction R, the value of "D3" is set to be equal to or less than the value of "D1" (D3≤D1). In the example, the outer peripheral surface of the core body portion 16 on the side in the second axial direction L2 with respect to the spaced portion 80 is formed to be equal in diameter to the outer peripheral surface of the core body portion 16 on the side in the first axial direction L1 with respect to the magnetic flux restriction portion 13. That is, in the example, the core body portion 16 is formed such that a relationship "D3=D1" is established.

As illustrated in FIG. 1, the magnetic flux exchange surface 17 of the first body portion 11 discussed above is formed by a part of the outer peripheral surface (cylindrical outer peripheral surface) of the first body portion 11 that is disposed to face the case 60 (the inner peripheral surface of the cylindrical portion of the case 60) in the radial direction R. The magnetic flux exchange surface 17 is formed on the side opposite of the target end portion 21a of the bobbin body portion 21 from the second body portion 12 in the axial direction L (the side in the second axial direction L2), and exchanges magnetic flux with the case 60 when the coil 3 is energized. In the embodiment, as described above, the diameter (D3) of the magnetic flux exchange surface 17 is larger than the diameter (D2) of a part of the outer peripheral surface of the first body portion 11 that faces the target end portion 21a of the bobbin body portion 21 in the radial direction R. That is, the magnetic flux exchange surface 17 is larger in diameter than a part of the outer peripheral surface of the first body portion 11 that faces the target end portion 21a of the bobbin body portion 21 in the radial direction R. In the example, the magnetic flux exchange surface 17 is equal in diameter to the outer peripheral surface of the second body portion 12. Consequently, the permeance between the magnetic flux exchange surface 17 and the case 60 can be increased (in other words, magnetic flux that leaks when magnetic flux is exchanged can be reduced) by securing a large magnetic path cross-sectional area between the magnetic flux exchange surface 17 and the case 60 compared to a case where the magnetic flux exchange surface 17 is equal in diameter to a part of the outer peripheral surface of the first body portion 11 that faces the target end portion 21a of the bobbin body portion 21 in the radial direction R.

As a supplementary description, in a simplified model, the permeance between the magnetic flux exchange surface 17 and a part of the case 60 to be fitted (externally fitted) with the magnetic flux exchange surface 17 is represented as "$\mu \times B/\Delta D$" when the difference between the diameter (D3) of the magnetic flux exchange surface 17 and the diameter of the part of the case 60 is defined as "$\Delta D$", the permeability of the magnetic path (here, air) is defined as "$\mu$", and the magnetic path cross-sectional area is defined as "B". When the width of the magnetic flux exchange surface 17 in the axial direction L is defined as "X", the magnetic path cross-sectional area (B) is represented as "$\pi \times D3 \times X$". Hence, as the diameter (D3) of the magnetic flux exchange surface 17 becomes larger, the magnetic path cross-sectional area (B) becomes larger, as a result of which the permeance also becomes larger (in other words, the magnetic resistance becomes smaller). In view of this respect, when the magnetic flux exchange surface 17 is larger in diameter than a part of the outer peripheral surface of the first body portion 11 that faces the target end portion 21a of the bobbin body portion 21 in the radial direction R, a large permeance can be secured between the magnetic flux exchange surface 17 and the case 60 compared to a case where the magnetic flux exchange surface 17 is equal in diameter to the part of the outer peripheral surface of the first body portion 11 that faces the target end portion 21a of the bobbin body portion 21 in the radial direction R, as a result of which the magnetic attraction force to be applied to the plunger 2 can be improved.

3. Method of Manufacturing Electromagnetic Drive Device

Figure 7:
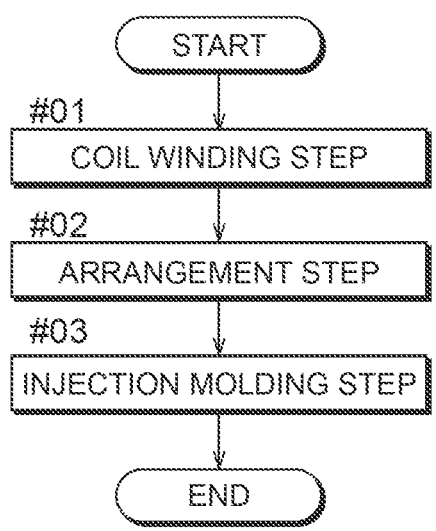
FIG. 7 is a flowchart illustrating a method of manufacturing the electromagnetic drive device according to the embodiment.

A method of manufacturing the electromagnetic drive device 1 according to the embodiment will be described with reference to FIGS. 2 to 7. As illustrated in FIG. 7, the method of manufacturing the electromagnetic drive device 1 according to the embodiment includes a coil winding step (step #01), an arrangement step (step #02), and an injection molding step (step #03).

Figure 2:
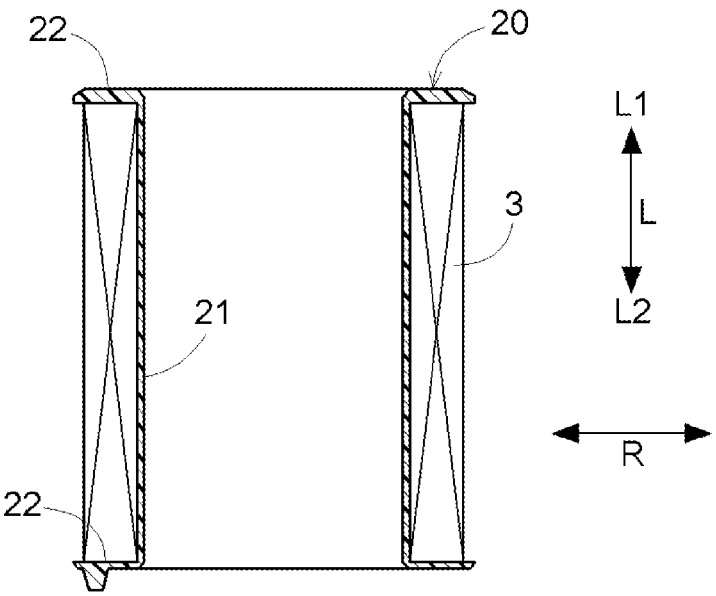
FIG. 2 is a sectional view illustrating the arrangement state of each portion after execution of a coil winding step according to the embodiment.

In the coil winding step (step #01), as illustrated in FIG. 2, the coil 3 is wound around the outer peripheral surface of the bobbin body portion 21. In the embodiment, the holding portions 22 are formed at the respective end portions of the bobbin body portion 21 on both sides in the axial direction L, and the coil 3 is disposed in a cylindrical space defined by the bobbin body portion 21 on the inner side in the radial direction R and defined by the pair of holding portions 22 on both sides in the axial direction L.

Figure 3:
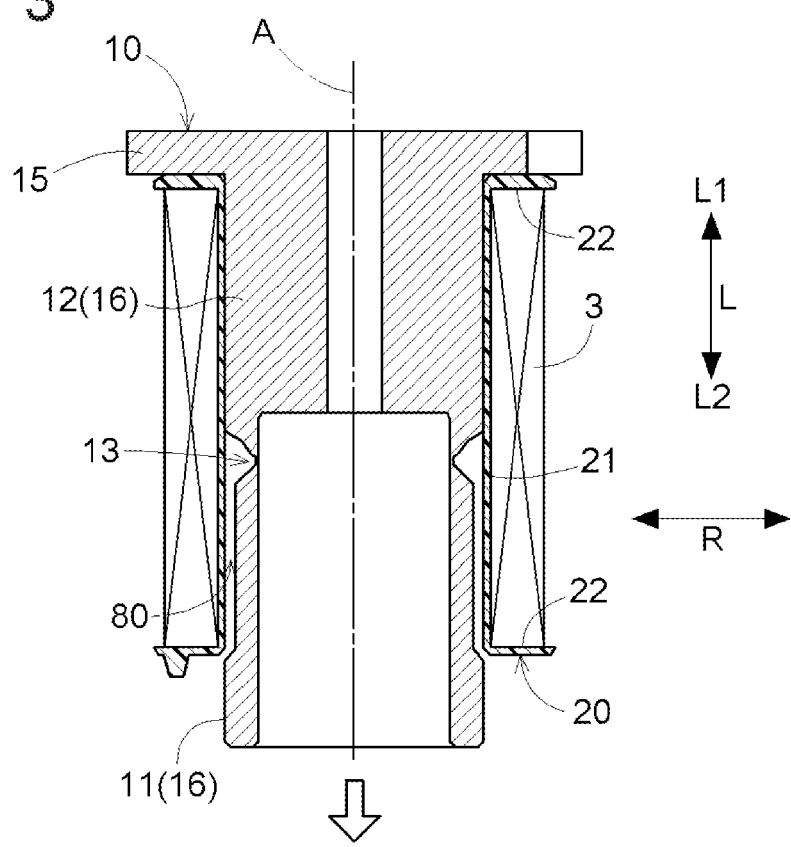
FIG. 3 is a sectional view illustrating the arrangement state of each portion after execution of an arrangement step according to the embodiment.

The arrangement step (step #02) is executed after execution of the coil winding step. In the arrangement step, as illustrated in FIG. 3, the core body portion 16 is disposed on the inner side of the bobbin body portion 21 in the radial direction R using the core 10 in which the core body portion 16 is provided with the magnetic flux restriction portion 13. In the embodiment, the holding portion 22 on the side in the first axial direction L1 is disposed so as to contact the flange portion 15 of the core 10 from the side in the second axial direction L2. With the holding portion 22 disposed in this way, as illustrated in FIG. 3, the magnetic flux restriction portion 13 is disposed in the region in which the bobbin body portion 21 is disposed in the axial direction L. In this state, in addition, the outer peripheral surface of the core body portion 16 and the inner peripheral surface of the bobbin body portion 21 contact each other on the side in the first axial direction L1 with respect to the magnetic flux restriction portion 13, and the spaced portion 80, in which the outer peripheral surface of the core body portion 16 and the inner peripheral surface of the bobbin body portion 21 are spaced from each other, is formed in the region in the axial direction L on the side in the second axial direction L2 with respect to the magnetic flux restriction portion 13 and corresponding to an end portion of the bobbin body portion 21 on the side in the second axial direction L2. That is, in the arrangement step, the core body portion 16 is disposed on the inner side of the bobbin body portion 21 in the radial direction R such that the outer peripheral surface of the second body portion 12 and the inner peripheral surface of the bobbin body portion 21 contact each other, and such that the outer peripheral surface of the first body portion 11 and the inner peripheral surface of the target end portion 21a of the bobbin body portion 21 are spaced from each other in at least a part of the region in the circumferential direction C (in the embodiment, the entire region in the circumferential direction C).

Figure 4:
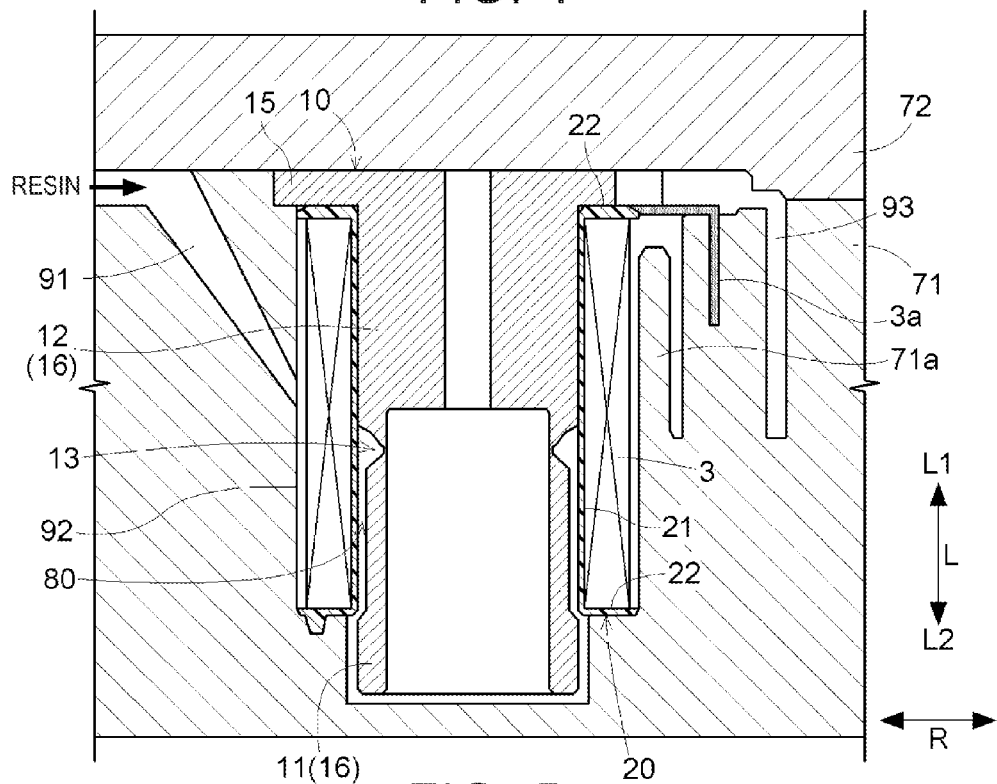
FIG. 4 is a sectional view illustrating the arrangement state of each portion during execution of an injection molding step according to the embodiment.

The injection molding step (step #03) is executed after execution of the arrangement step. In the injection molding step, the connector portion 40 and the cover portion 30 are integrally formed through injection molding of a resin. In the embodiment, in the injection molding step, as illustrated in FIGS. 4 and 5, the connector portion 40 and the cover portion 30 are integrally formed through injection molding of a resin (molding material) such that the coupling portion 50 between the connector portion 40 and the cover portion 30 is formed on the side in the first axial direction L1 with respect to the magnetic flux restriction portion 13. The injection molding step will be specifically described below.

First, as illustrated in FIG. 4, the core 10 and the bobbin 20 with the core body portion 16 disposed on the inner side of the bobbin body portion 21 in the radial direction R are disposed inside a first molding die 71 and a second molding die 72. The core 10 and the bobbin 20 may be disposed inside the first molding die 71 and the second molding die 72 in the arrangement step. The core 10 is disposed as held by the first molding die 71 and the second molding die 72 from both sides in the axial direction L. In the example, the flange portion 15 of the core 10 is held by the first molding die 71 and the second molding die 72 from both sides in the axial direction L via the bobbin 20 around which the coil 3 has been wound.

A cover void 92 that corresponds to the shape of the cover portion 30 and a connector void 93 that corresponds to the shape of the connector portion 40 are formed with the core 10 and the bobbin 20 disposed inside the first molding die 71 and the second molding die 72. The connector void 93 communicates with the cover void 92 via a void that corresponds to the shape of the coupling portion 50. A resin (in the example, a thermoplastic resin) in a molten state is charged into the voids via an injection path 91. In the embodiment, although not illustrated, a resin from an identical resin supply source is supplied uniformly from a plurality of locations in the circumferential direction C to the cover void 92. By cooling the charged resin to cure the resin, the cover portion 30 and the connector portion 40 are integrally formed (molded) as coupled by the coupling portion 50 as illustrated in FIG. 5. In this event, the cover portion 30 is insert-molded so as to be integrated with the bobbin 20 and the coil 3, and the connector portion 40 is insert-molded so as to be integrated with the power feed terminal 3a.

Figure 8:
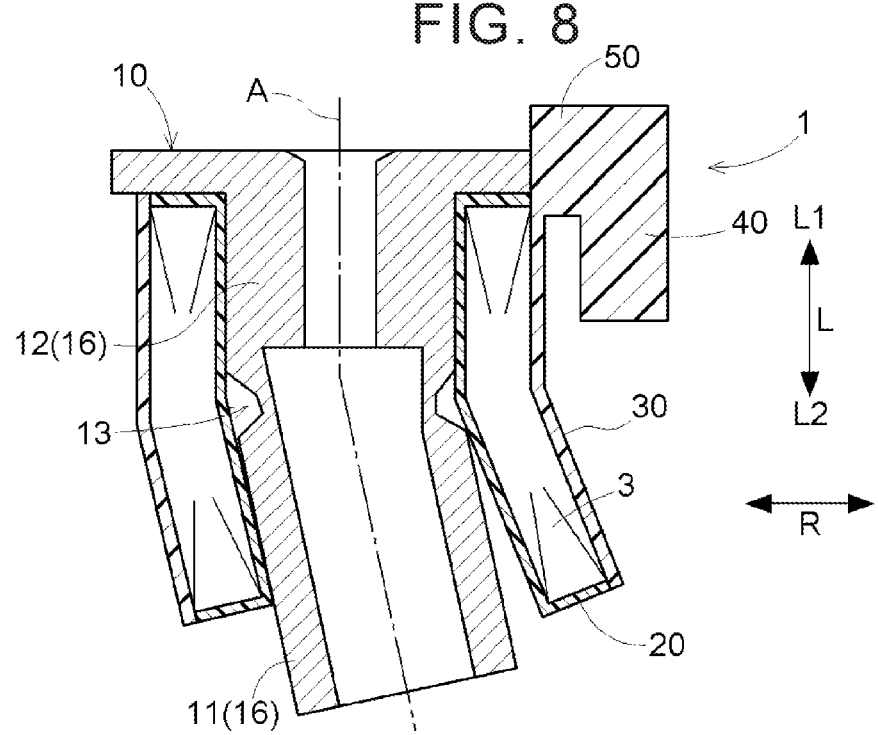
FIG. 8 is a sectional view of an electromagnetic drive device according to a comparative example.

In the embodiment, providing the spaced portion 80 makes it possible to integrally form the cover portion 30 and the connector portion 40 through injection molding of a resin while suppressing deformation of the core 10 (in particular, the first body portion 11 of the core body portion 16) in which the plunger housing space S is formed. This respect will be described with reference to the embodiment of the present disclosure illustrated in FIG. 5 etc. and a comparative example illustrated in FIG. 8. FIG. 8 illustrates a comparative example to which the present disclosure is not applied, in which the spaced portion 80 discussed above is not formed. Although the electromagnetic drive device illustrated in FIG. 8 is not an embodiment of the present disclosure, reference numerals that are the same as those of FIG. 5 etc. are given in order to facilitate understanding.

When the resin is cooled to be cured in the injection molding step, the volume of the resin is decreased, which generates a contraction force in the resin. The cover portion 30, which is formed through injection molding, is formed so as to cover the coil 3 from the outer side in the radial direction R over the entire region of the bobbin body portion 21 in the axial direction L and the circumferential direction C. Therefore, when the resin which constitutes the cover portion 30 is cooled to be cured, the contraction force of the resin may be applied to the core body portion 16 which is disposed on the inner side of the bobbin body portion 21 in the radial direction R via the bobbin body portion 21 which is disposed on the inner side of the cover portion 30 in the radial direction R. If the contraction force is uniform, or generally uniform, in the circumferential direction C, the core body portion 16 may not be deformed to such a degree as to reduce the performance of the electromagnetic drive device 1. In the case where the cover portion 30 and the connector portion 40 are integrally formed through injection molding of a resin, however, an offset load may be applied to the core body portion 16 with the contraction force which is applied to the core body portion 16 being non-uniform in the circumferential direction C, which may deform the core body portion 16 to such a degree as to reduce the performance of the electromagnetic drive device 1.

The reason is as follows. As illustrated in FIG. 4, the molding die (in the example, the first molding die 71) used during execution of the injection molding step is provided with a die part 71a that separates a part (in the example, the tubular portion 41) of the connector portion 40 that extends in the axial direction L on the outer side of the cover portion 30 in the radial direction R and the cover portion 30 from each other in the radial direction R. When a resin in a molten state is charged, the molding die also becomes hot. However, the die part 71a, which has a limited heat conduction path, is cooled at a low speed compared to other parts of the molding die. In addition, a great amount of resin is charged in the vicinity of the die part 71a in order to form the connector portion 40. Therefore, the resin in the vicinity of the die part 71a is cured at a delayed timing compared to the resin in the other parts, and the resin which has already been cured is pulled toward the die part 71a because of a contraction force generated when the resin in the vicinity of the die part 71a is cured. In addition, as illustrated in FIG. 6, the coupling portion 50 between the cover portion 30 and the connector portion 40 is formed in a part of the region in the circumferential direction C, and the coupling portion 50 is formed on the side in the first axial direction L1 with respect to the magnetic flux restriction portion 13. Consequently, the contraction force of the resin that is cured at a delayed timing is also offset significantly. Because of such factors, in the configuration described above, as illustrated in an exaggerated manner in relation to the comparative example of FIG. 8, the bobbin 20 may be deformed such that an end portion of the bobbin 20 on the side in the second axial direction L2 is brought closer to the coupling portion 50, along with which the core body portion 16 may also be deformed.

In view of this respect, in the embodiment, as discussed above, the spaced portion 80, in which the outer peripheral surface of the core body portion 16 (first body portion 11) and the inner peripheral surface of the bobbin body portion 21 are spaced from each other, is formed in the region in the axial direction L corresponding to an end portion (target end portion 21a) of the bobbin body portion 21 on the side in the second axial direction L2. In the embodiment, further, the spaced portion 80 is formed over the entire region in the circumferential direction C, so that the region in the circumferential direction C on the side opposite of the axis A from the region where the coupling portion 50 is disposed is included in the region in which the spaced portion 80 is formed in the circumferential direction C. Consequently, it is possible to suppress deformation of the core body portion 16 by suppressing contact between the bobbin body portion 21 and the core body portion 16 (first body portion 11) in the case where the bobbin 20 is deformed as described above.

In the embodiment, in the arrangement step, the core 10 is brought closer to the bobbin 20 in the axial direction L to fit the outer peripheral surface of the core body portion 16 with the inner peripheral surface of the bobbin body portion 21. Therefore, the outer peripheral surface of the core body portion 16 and the inner peripheral surface of the bobbin body portion 21 contact each other on the side in the first axial direction L1 with respect to the magnetic flux restriction portion 13 to such a degree that the outer peripheral surface of the core body portion 16 can be fitted with the inner peripheral surface of the bobbin body portion 21 at least after execution of the arrangement step. Regarding this respect, as described above, when the resin which constitutes the cover portion 30 is cooled to be cured, the contraction force of the resin is applied to the bobbin body portion 21 in the direction of reducing the diameter. Therefore, the degree of contact between the outer peripheral surface of the core body portion 16 and the inner peripheral surface of the bobbin body portion 21 on the side in the first axial direction L1 with respect to the magnetic flux restriction portion 13 is enhanced by execution of the injection molding step.

4. Other Embodiments

Lastly, an electromagnetic drive device and a method of manufacturing an electromagnetic drive device according to other embodiments of the present disclosure will be described. A configuration disclosed in each of the following embodiments may be applied in combination with a configuration disclosed in any other embodiment unless any contradiction occurs.

(1) In the embodiment described above, the arrangement step is executed after execution of the coil winding step. However, embodiments of the present disclosure are not limited thereto. The order of the coil winding step and the arrangement step may be reversed. In this case, the coil 3 is wound around the bobbin body portion 21 which is disposed on the outer side of the core body portion 16 in the radial direction R in the coil winding step. In either case, the coil winding step is executed before the injection molding step.

Figure 9:
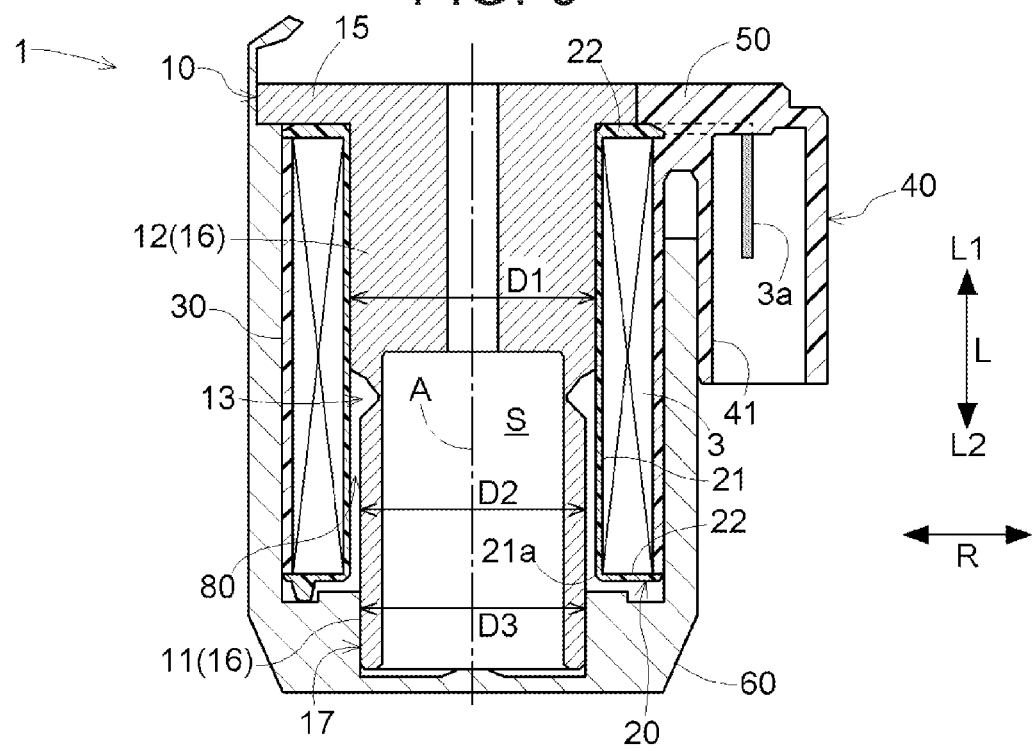
FIG. 9 is a sectional view of an electromagnetic drive device according to another embodiment.

(2) In the embodiment described above, the outer peripheral surface of the core body portion 16 on the side in the second axial direction L2 with respect to the spaced portion 80 is formed to be larger in diameter than the outer peripheral surface of the core body portion 16 in the region in which the spaced portion 80 is formed in the axial direction L. However, embodiments of the present disclosure are not limited thereto. For example, as in the example illustrated in FIG. 9, the outer peripheral surface of the core body portion 16 on the side in the second axial direction L2 with respect to the spaced portion 80 may be formed to be equal in diameter to the outer peripheral surface of the core body portion 16 in the region in which the spaced portion 80 is formed in the axial direction L. In this case, the magnetic flux exchange surface 17 is equal in diameter to a part of the outer peripheral surface of the first body portion 11 that faces the target end portion 21a of the bobbin body portion 21 in the radial direction R. That is, the diameter (D3) of the magnetic flux exchange surface 17 is equal to the diameter (D2) of a part of the outer peripheral surface of the first body portion 11 that faces the target end portion 21a of the bobbin body portion 21 in the radial direction R.

Figure 10:
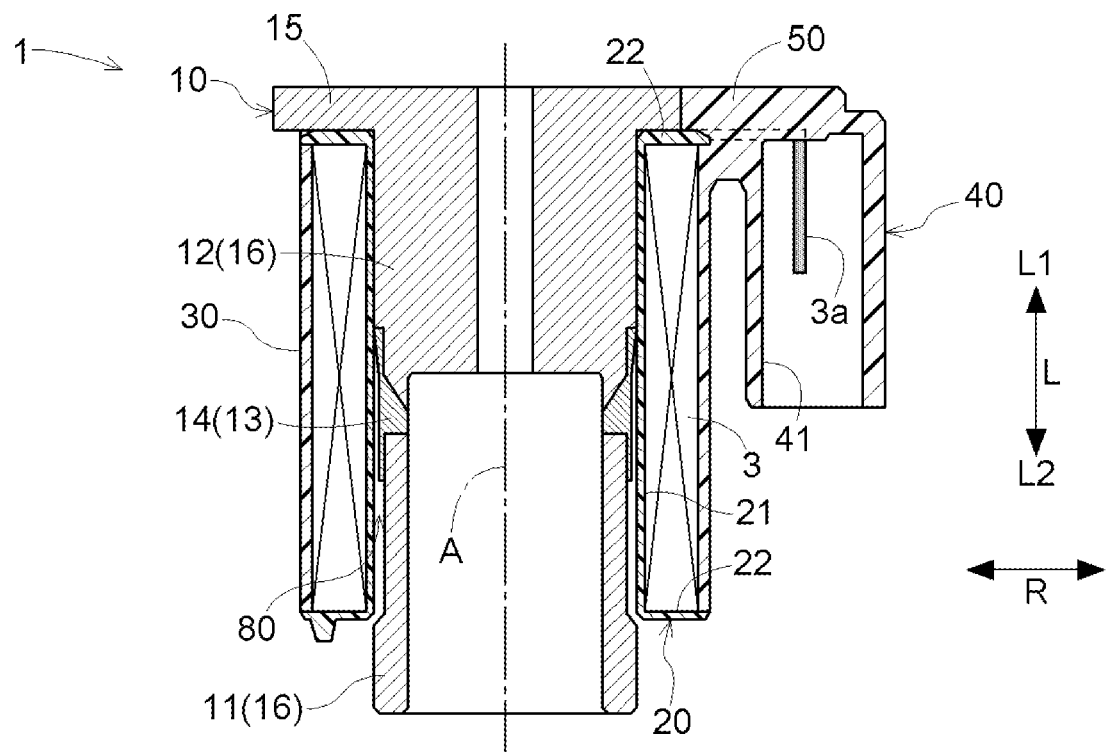
FIG. 10 is a sectional view of an electromagnetic drive device according to another embodiment.

(3) In the embodiment described above, the magnetic flux restriction portion 13 is formed by reducing the wall thickness (the thickness of the first body portion 11) of the core body portion 16 at a location where the magnetic flux restriction portion 13 is formed to be smaller than that of parts in the axial direction L on both sides of the region. However, embodiments of the present disclosure are not limited thereto. For example, as in the example illustrated in FIG. 10, a part of the core body portion 16 on the side in the first axial direction L1 with respect to the magnetic flux restriction portion 13 and a part of the core body portion 16 on the side in the second axial direction L2 with respect to the magnetic flux restriction portion 13 may be coupled to each other in the axial direction L by a coupling member 14 that forms the magnetic flux restriction portion 13. The coupling member 14 is formed from a non-magnetic material, and couples parts of the core body portion 16 that are disposed separately on both sides of the magnetic flux restriction portion 13 in the axial direction L to each other in a magnetically separated manner. Coupling by the coupling member 14 may be implemented by joining through swaging or joining through brazing, for example.

(4) In the embodiment described above, the region in the axial direction L in which the spaced portion 80 is formed is set as a region in the axial direction L that extends from the position, in the axial direction L, of an end portion of the bobbin body portion 21 on the side in the second axial direction L2 to the region in the axial direction L in which the magnetic flux restriction portion 13 is formed in the axial direction L. That is, the outer peripheral surface of the first body portion 11 and the inner peripheral surface of the bobbin body portion 21 are spaced from each other in the entire region, in the axial direction, on the side in the second axial direction L2 with respect to the magnetic flux restriction portion 13 in the axial direction L. However, embodiments of the present disclosure are not limited thereto. The spaced portion 80 may be formed at least at a position in the axial direction L corresponding to an end portion (target end portion 21a) of the bobbin body portion 21 on the side in the second axial direction L2 (e.g. a position that is the same in the axial direction L as the end portion), and an end portion of the region in the axial direction L in which the spaced portion 80 is formed on the side in the first axial direction L1 may be set on the side in the second axial direction L2 with respect to the region in which the magnetic flux restriction portion 13 is formed. That is, the outer peripheral surface of the first body portion 11 and the inner peripheral surface of the bobbin body portion 21 may be separated from each other in only a part of the region in the axial direction L on the side in the second axial direction L2 with respect to the magnetic flux restriction portion 13 in the axial direction L (note that the region should include a position that is the same in the axial direction L as the target end portion 21a).

Figure 11:
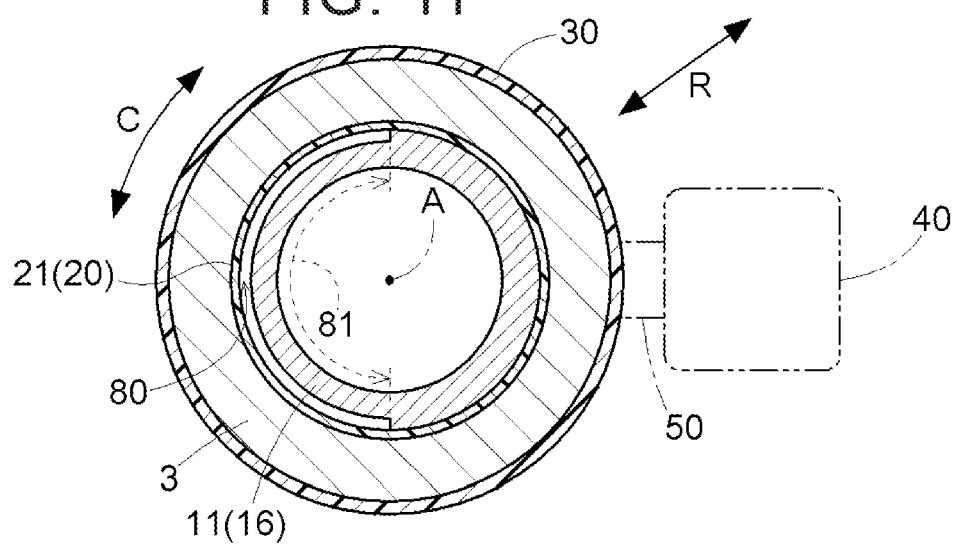
FIG. 11 is a cross-sectional view of an electromagnetic drive device according to another embodiment.

(5) In the embodiment described above, the spaced portion 80 is formed over the entire region in the circumferential direction C. However, embodiments of the present disclosure are not limited thereto. The spaced portion 80 may be formed in only a part of the region in the circumferential direction C. That is, the outer peripheral surface of the first body portion 11 and the inner peripheral surface of the target end portion 21a of the bobbin body portion 21 may be spaced from each other in only a part of the region in the circumferential direction C (a specific region 81 to be discussed later). Here, when the region in the circumferential direction C in which the spaced portion 80 is formed is defined as the specific region 81, the specific region 81 is preferably set in a region in the circumferential direction C on the side opposite of the axis A from the region where the coupling portion 50 is disposed as in the example illustrated in FIG. 11. In the example illustrated in FIG. 11, the specific region 81 is set as a region that has a range of 180 degrees. The specific region 81 may also be set as a region that has a range of less than 180 degrees (e.g. a region in the circumferential direction C that is shifted by 180 degrees from the region in which the coupling portion 50 is disposed in the circumferential direction C).

(6) In the embodiment described above, the inner peripheral surface of the bobbin body portion 21 is formed to be uniform (equal in diameter) in the entire region in the axial direction L. However, embodiments of the present disclosure are not limited thereto. The inner peripheral surface of the bobbin body portion 21 in the region in which the spaced portion 80 is formed in the axial direction L may be formed to be larger in diameter than the inner peripheral surface of the bobbin body portion 21 on the side in the first axial direction L1 with respect to the magnetic flux restriction portion 13. In this case, unlike the embodiment described above, the outer peripheral surface of the core body portion 16 may be formed to be uniform in the entire region in the axial direction L excluding the region in which the magnetic flux restriction portion 13 is formed.

(7) In the embodiment described above, the connector portion 40 is coupled to the cover portion 30 on the side in the first axial direction L1 with respect to the magnetic flux restriction portion 13. However, embodiments of the present disclosure are not limited thereto. The connector portion 40 may be coupled to the cover portion 30 at the same position in the axial direction L as the magnetic flux restriction portion 13, or the connector portion 40 may be coupled to the cover portion 30 on the side in the second axial direction L2 with respect to the magnetic flux restriction portion 13.

(8) In the embodiment described above, the first axial direction L1 is the direction from the side of the electromagnetic drive device 1 toward the side of a device (in the embodiment described above, the valve portion 4) to be driven by the electromagnetic drive device 1 along the axial direction L. However, embodiments of the present disclosure are not limited thereto. The device to be driven by the electromagnetic drive device 1 may be disposed on the side in the second axial direction L2 with respect to the electromagnetic drive device 1, and the first axial direction L1 may be the direction from the side of the device to be driven toward the side of the electromagnetic drive device 1 along the axial direction L. In this case, unlike the embodiment described above, the second body portion 12 may be formed in a columnar shape that extends in the axial direction L rather than a cylindrical shape that extends in the axial direction L. In this case, the second body portion 12 is formed in a solid columnar shape that extends in the axial direction L.

(9) In the embodiment, the electromagnetic drive device according to the present disclosure is applied to the electromagnetic valve 90. However, embodiments of the present disclosure are not limited thereto. As a matter of course, the electromagnetic drive device according to the present disclosure may also be applied to devices other than electromagnetic valves.

(10) Also regarding other configurations, the embodiment disclosed herein is illustrative in all respects, and it should be understood that the scope of the present disclosure is not limited thereto. It would be easy for a person skilled in the art to understand that the present disclosure may be altered as appropriate without departing from the scope and spirit of the present disclosure. Thus, it is a matter of course that other embodiments obtained by altering the present disclosure without departing from the scope and spirit of the present disclosure are also included in the scope of the present disclosure.

INDUSTRIAL APPLICABILITY

The present disclosure may be applied to an electromagnetic drive device that includes a core that has a core body portion, a bobbin in which a tubular bobbin body portion is disposed over the entire region in the circumferential direction on the outer side of the core body portion in the radial direction, a coil wound around the outer peripheral surface of the bobbin body portion, a cover portion that covers the coil from the outer side in the radial direction over the entire region of the bobbin body portion in the axial direction and the circumferential direction, and a connector portion that houses a power feed terminal of the coil, the electromagnetic drive device controlling the position of a sliding member in a housing space formed by the core body portion in the axial direction in accordance with the state of power feed to the coil, and relates to a method of manufacturing the electromagnetic drive device.

DESCRIPTION OF THE REFERENCE NUMERALS

1 ELECTROMAGNETIC DRIVE DEVICE
2 PLUNGER (SLIDING MEMBER)
3 COIL
3a POWER FEED TERMINAL
10 CORE
11 FIRST BODY PORTION
12 SECOND BODY PORTION
13 MAGNETIC FLUX RESTRICTION PORTION
16 CORE BODY PORTION
17 MAGNETIC FLUX EXCHANGE SURFACE
20 BOBBIN
21 BOBBIN BODY PORTION
21a TARGET END PORTION
30 COVER PORTION
40 CONNECTOR PORTION
81 SPECIFIC REGION

A AXIS
C CIRCUMFERENTIAL DIRECTION
L AXIAL DIRECTION
R RADIAL DIRECTION
S PLUNGER HOUSING SPACE (HOUSING SPACE)

The invention claimed is:

1. An electromagnetic drive device comprising a core that has a core body portion that extends in an axial direction, a bobbin that has a tubular bobbin body portion that extends in the axial direction, the bobbin body portion being disposed on an outer side of the core body portion in a radial direction over an entire region of the core body portion in a circumferential direction, a coil wound around an outer peripheral surface of the bobbin body portion, a cover portion that covers the coil from the outer side in the radial direction over an entire region of the bobbin body portion in the axial direction and the circumferential direction, and a connector portion that houses a power feed terminal of the coil, the core body portion including a first body portion and a second body portion coupled to each other in the axial direction, the first body portion being formed in a tubular shape that extends in the axial direction, and a space surrounded by an inner peripheral surface of the first body portion forming a housing space for a sliding member that slides in the axial direction along the inner peripheral surface, the second body portion being formed in a tubular shape that extends in the axial direction and that has an inner peripheral surface that is smaller in diameter than the inner peripheral surface of the first body portion, or formed in a solid columnar shape that extends in the axial direction, and the electromagnetic drive device controlling a position of the sliding member in the housing space in the axial direction in accordance with a state of power feed to the coil, wherein:

the cover portion and the connector portion are integrally formed from a resin; and an outer peripheral surface of the second body portion and an inner peripheral surface of the bobbin body portion contact each other, and an outer peripheral surface of the first body portion and an inner peripheral surface of a target end portion, which is an end portion of the bobbin body portion on a side in a direction from the second body portion toward the first body portion in the axial direction, are spaced from each other in at least a part of a region in the circumferential direction.

2. The electromagnetic drive device according to claim 1, wherein:

the first body portion has a magnetic flux restriction portion provided in a region in which the bobbin body portion is disposed in the axial direction, the magnetic flux restriction portion restricting magnetic flux that passes through the first body portion in the axial direction;

a thickness of the first body portion at a location where the magnetic flux restriction portion is formed is smaller than a thickness of parts of the core body portion positioned in the axial direction on both sides of the magnetic flux restriction portion; and the outer peripheral surface of the first body portion and the inner peripheral surface of the bobbin body portion are spaced from each other in an entire region in the axial direction on a side opposite of the magnetic flux restriction portion from the second body portion in the axial direction.

3. The electromagnetic drive device according to claim 2, further comprising:
a case that houses the cover portion, wherein:
the first body portion has a magnetic flux exchange surface provided on a side opposite of the target end portion of the bobbin body portion from the second body portion in the axial direction, the magnetic flux exchange surface being an outer peripheral surface disposed so as to face the case in the radial direction in order to exchange magnetic flux with the case; and
the magnetic flux exchange surface is larger in diameter than a part of the outer peripheral surface of the first body portion that faces the target end portion of the bobbin body portion in the radial direction.

4. The electromagnetic drive device according to claim 3, wherein:
a coupling portion between the connector portion and the cover portion is formed in a part of a region in the circumferential direction;
the outer peripheral surface of the first body portion and the inner peripheral surface of the target end portion of the bobbin body portion are spaced from each other in a specific region in the circumferential direction; and
the specific region is a region in the circumferential direction on a side opposite of an axis of the core body portion from the region where the coupling portion is disposed.

5. The electromagnetic drive device according to claim 3, wherein
the outer peripheral surface of the first body portion and the inner peripheral surface of the target end portion of the bobbin body portion are spaced from each other in an entire region in the circumferential direction.

6. The electromagnetic drive device according to claim 3, wherein
the connector portion has a part that extends in the axial direction on an outer side of the cover portion in the radial direction.

7. The electromagnetic drive device according to claim 2, wherein:
a coupling portion between the connector portion and the cover portion is formed in a part of a region in the circumferential direction;
the outer peripheral surface of the first body portion and the inner peripheral surface of the target end portion of the bobbin body portion are spaced from each other in a specific region in the circumferential direction; and
the specific region is a region in the circumferential direction on a side opposite of an axis of the core body portion from the region where the coupling portion is disposed.

8. The electromagnetic drive device according to claim 7, wherein
the connector portion has a part that extends in the axial direction on an outer side of the cover portion in the radial direction.

9. The electromagnetic drive device according to claim 2, wherein
the outer peripheral surface of the first body portion and the inner peripheral surface of the target end portion of the bobbin body portion are spaced from each other in an entire region in the circumferential direction.

10. The electromagnetic drive device according to claim 2, wherein the connector portion has a part that extends in the axial direction on an outer side of the cover portion in the radial direction.

11. The electromagnetic drive device according to claim 1, further comprising:
a case that houses the cover portion, wherein:
the first body portion has a magnetic flux exchange surface provided on a side opposite of the target end portion of the bobbin body portion from the second body portion in the axial direction, the magnetic flux exchange surface being an outer peripheral surface disposed so as to face the case in the radial direction in order to exchange magnetic flux with the case; and
the magnetic flux exchange surface is larger in diameter than a part of the outer peripheral surface of the first body portion that faces the target end portion of the bobbin body portion in the radial direction.

12. The electromagnetic drive device according to claim 11, wherein:
a coupling portion between the connector portion and the cover portion is formed in a part of a region in the circumferential direction;
the outer peripheral surface of the first body portion and the inner peripheral surface of the target end portion of the bobbin body portion are spaced from each other in a specific region in the circumferential direction; and
the specific region is a region in the circumferential direction on a side opposite of an axis of the core body portion from the region where the coupling portion is disposed.

13. The electromagnetic drive device according to claim 11, wherein
the outer peripheral surface of the first body portion and the inner peripheral surface of the target end portion of the bobbin body portion are spaced from each other in an entire region in the circumferential direction.

14. The electromagnetic drive device according to claim 11, wherein
the connector portion has a part that extends in the axial direction on an outer side of the cover portion in the radial direction.

15. The electromagnetic drive device according to claim 1, wherein:
a coupling portion between the connector portion and the cover portion is formed in a part of a region in the circumferential direction;
the outer peripheral surface of the first body portion and the inner peripheral surface of the target end portion of the bobbin body portion are spaced from each other in a specific region in the circumferential direction; and
the specific region is a region in the circumferential direction on a side opposite of an axis of the core body portion from the region where the coupling portion is disposed.

16. The electromagnetic drive device according to claim 15, wherein
the connector portion has a part that extends in the axial direction on an outer side of the cover portion in the radial direction.

17. The electromagnetic drive device according to claim 1, wherein
the outer peripheral surface of the first body portion and the inner peripheral surface of the target end portion of the bobbin body portion are spaced from each other in an entire region in the circumferential direction.

18. The electromagnetic drive device according to claim 17, wherein the connector portion has a part that extends in the axial direction on an outer side of the cover portion in the radial direction.

19. The electromagnetic drive device according to claim 1, wherein
the connector portion has a part that extends in the axial direction on an outer side of the cover portion in the radial direction.

20. A method of manufacturing an electromagnetic drive device including a core that has a core body portion that extends in an axial direction, a bobbin that has a tubular bobbin body portion that extends in the axial direction, the bobbin body portion being disposed on an outer side of the core body portion in a radial direction over an entire region of the core body portion in a circumferential direction, a coil wound around an outer peripheral surface of the bobbin body portion, a cover portion that covers the coil from the outer side in the radial direction over an entire region of the bobbin body portion in the axial direction and the circumferential direction, and a connector portion that houses a power feed terminal of the coil, the core body portion including a first body portion and a second body portion coupled to each other in the axial direction, the first body portion being formed in a tubular shape that extends in the axial direction, and a space surrounded by an inner peripheral surface of the first body portion forming a housing space for a sliding member that slides in the axial direction along the inner peripheral surface, the second body portion being formed in a tubular shape that extends in the axial direction and that has an inner peripheral surface that is smaller in diameter than the inner peripheral surface of the first body portion, or formed in a solid columnar shape that extends in the axial direction, and the electromagnetic drive device controlling a position of the sliding member in the housing space in the axial direction in accordance with a state of power feed to the coil, the method comprising:
an arrangement step of disposing the core body portion on an inner side of the bobbin body portion in the radial direction such that an outer peripheral surface of the second body portion and an inner peripheral surface of the bobbin body portion contact each other, and such that an outer peripheral surface of the first body portion and an inner peripheral surface of a target end portion, which is an end portion of the bobbin body portion on a side in a direction from the second body portion toward the first body portion in the axial direction, are spaced from each other in at least a part of a region in the circumferential direction; and
an injection molding step of integrally forming the connector portion and the cover portion through injection molding of a resin, the injection molding step being executed after execution of the arrangement step.

* * * * *